United States Patent
Yokoyama (10) Patent No.: US 8,984,710 B2
(45) Date of Patent: Mar. 24, 2015

(54) BLOWER APPARATUS AND AN AIR CONVEYING APPARATUS

(75) Inventor: Yoshikazu Yokoyama, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 539 days.

(21) Appl. No.: 13/237,800

(22) Filed: Sep. 20, 2011

(65) Prior Publication Data

US 2012/0073080 A1    Mar. 29, 2012

(30) Foreign Application Priority Data

Sep. 29, 2010    (JP) ................. 2010-219601

(51) Int. Cl.
*A47L 5/14* (2006.01)
*A01G 1/12* (2006.01)

(52) U.S. Cl.
CPC .. *A01G 1/125* (2013.01); *A47L 5/14* (2013.01)
USPC ........................................... 15/327.5; 15/405

(58) Field of Classification Search
USPC .............. 15/327.5, 323, 344, 405, 330
See application file for complete search history.

(56) References Cited

U.S. PATENT DOCUMENTS

| | | | | |
|---|---|---|---|---|
| 4,870,714 A | * | 10/1989 | Miner | 15/327.5 |
| 6,105,205 A | * | 8/2000 | Takahashi et al. | 15/339 |
| 7,476,091 B2 | * | 1/2009 | Saitou et al. | 417/423.1 |
| 2002/0104184 A1 | * | 8/2002 | Rogers et al. | 15/327.5 |
| 2002/0157209 A1 | | 10/2002 | Marshall et al. | |
| 2005/0123410 A1 | | 6/2005 | Saitou et al. | |

FOREIGN PATENT DOCUMENTS

| | | |
|---|---|---|
| EP | 0961257 A2 | 12/1999 |
| EP | 1253249 A2 | 10/2002 |
| EP | 1537814 A2 | 6/2005 |
| JP | 59-171288 U | 11/1984 |
| JP | 2008-038686 A | 2/2008 |
| JP | 2009-264296 A | 11/2009 |
| WO | WO9730615 A1 | 8/1997 |

OTHER PUBLICATIONS

Extended European Search Report for application EP11007539.7 dated Jun. 17, 2014, 8 pages.
Japan Patent Office office action for patent application JP2010-219601 (Feb. 4, 2014).

* cited by examiner

*Primary Examiner* — Robert Scruggs
(74) *Attorney, Agent, or Firm* — Kilpatrick Townsend & Stockton LLP (57) ABSTRACT

A blower apparatus includes: a housing has a discharge port for discharging an air current generated by a fan; and an air conveying tube which includes a plurality of tubular members including first and second tubular members which are connected to each other and which guides the air current discharged from the discharge port in a predetermined direction. The first tubular member includes an outer circumferential surface which is formed so as to gradually decrease in diameter. The second tubular member includes an inner circumferential surface which is formed so as to gradually increase in diameter. The first and second tubular members are connected to each other through the outer circumferential surface and the inner circumferential surface. One of the tubular members which is connected to the housing is configured to be connected to the housing at a plurality of rotational positions about an axis of the tubular member.

10 Claims, 4 Drawing Sheets

BLOWER APPARATUS AND AN AIR CONVEYING APPARATUS

This application claims priority to Japanese Patent Application No. 2010-219601, filed Sep. 29, 2010 the entirety of which is incorporated by reference herein.

BACKGROUND

The present invention relates to a blower apparatus for use in blowing fallen leaves or cut grass for collection and an air conveying apparatus.

Generally, as blower apparatuses of this type, there is a blower apparatus having a drive unit, a fan that is rotated by the drive unit and an exhaust pipe including a plurality of tubular members in which the plurality of tubular members are connected together by fitting projecting portions formed on an outer circumferential side of one of the tubular members in attaching grooves formed in an inner circumferential side of the other tubular member (refer to JP-A-2009-264296, for example). Among those blower apparatuses, in a blower apparatus described in JP-A-2009-264296, the attaching groove formed in the tubular member has a T-shape so as to branch into two directions, and the projecting portion is selectively positioned in one of the branches of the attaching groove, whereby the orientation of a nozzle at a distal end of the exhaust pipe is allowed to be changed through 90°,

SUMMARY

In the case of the blower apparatus described in JP-A-2009-264296, when the plurality of tubular members are formed by blow molding, in particular, in which a material is forcibly swollen to match a mold cavity from the inside of the material and shaping by internal air pressure, it becomes difficult to form the tubular members to a predetermined thickness or to form an inner circumferential surface into a predetermined shape with good accuracy. Therefore, there may be caused a situation in which an outer circumferential surface of one of the plurality of tubular members and the inner circumferential surface of the other tubular member interfere with each other to thereby prevent the fitting of the tubular members or a situation in which a gap between the outer circumferential surface and the inner circumferential surface of the plurality of tubular members is increased, leading to the generation of looseness therebetween at the connecting portion. On the other hand, it is considered to adopt a configuration in which a tubular member which is formed so as to gradually decrease in diameter at one end is forcibly turned into a tubular member which is formed so as to gradually increase in diameter at one end so as to connect the tubular members together. However, as this occurs, even in the event that there is caused a slight molding error in the molded tubular members, both the tubular members can still be connected together, and the generation of looseness at the connecting portion can be eliminated. However, the angle at which the tubular members are connected by forcibly being turned one into the other is affected by the molding error, and the shape of a distal end of an air conveying tube is limited to a circular shape.

The invention has been made in view of these situations, and an object thereof is to provide a blower apparatus which can employ an air conveying tube in which tubular members can preferably connected together although the tubular members are not fabricated with good dimensional accuracy and which can be shaped to any other shapes than a circular shape at a distal end thereof.

An aspect of the invention provides the following arrangements:

(1) A blower apparatus comprising:
    a fan;
    a drive unit configured to drive the fan;
    a housing which accommodates the fan and which has a discharge port for discharging an air current generated by the fan; and
    an air conveying tube which includes a plurality of tubular members including first and second tubular members which are connected to each other and which guides the air current discharged from the discharge port in a predetermined direction,
    wherein one of the tubular members which is connected to the housing is configured to be connected to the housing at a plurality of rotational positions about an axis of the tubular member.

(2) The blower apparatus according to (1), wherein
    the first tubular member includes, at one end thereof, an outer circumferential surface which is formed so as to gradually decrease in diameter,
    the second tubular member includes, at one end thereof, an inner circumferential surface which is formed so as to gradually increase in diameter,
    the first and second tubular members are connected to each other through the outer circumferential surface and the inner circumferential surface.

(3) The blower apparatus according to (1), wherein
    the housing and the one of the tubular members are rotatably connected together.

(4) A blower apparatus according to (1), wherein
    a projecting portion is formed on an outer circumferential surface of the first tubular member, and a guide groove for guiding the projecting portion is formed in the second tubular member.

(5) The blower apparatus according to (1), wherein
    one of the discharge portion and the one of the tubular members includes at least one projecting portion which projects radially outwards or radially inwards,
    the other of the discharge portion and the one of the tubular members includes:
        an insertion groove which communicates to an end of the other of the discharge portion and the one of the tubular members so as to allow the projecting portion to fit therein; and
        irregular grooves which communicate with the insertion groove and which includes recess portions and projecting portions which are formed alternately along a circumferential direction, the recess portions having a depth which is substantially equal to a depth of the insertion groove, the projecting portions having a height which is smaller than the depth of the insertion groove.

(6) The blower apparatus according to (1), wherein
    the one of the tubular members is connected to the housing by being inserted into an inside of the discharge port.

(7) The blower apparatus according to (3) further comprising a connecting member which is connected rotatably to the housing,
    wherein the one of the tubular members is connected to the housing through the connecting member.

(8) The blower apparatus according to (7), wherein
    one of the connecting member and the one of the housing is formed with a guide groove, at least part of the guide groove having an arc shape, and
    the connecting member is connected to the housing by inserting a fastener in the guide groove.

(9) The blower apparatus according to (1), wherein
at least one of the first and second tubular members is formed by blow molding.

(10) The blower apparatus according to (1), wherein the one of the tubular members is the first or second tubular member.

(11) The blower apparatus according to (1), wherein the one of the tubular members is a tubular member other than the first and second tubular members.

(12) An air conveying apparatus comprising:
a housing which has an air conveying port for conveying an air current; and
an air conveying tube which includes a plurality of tubular members including first and second tubular members which are connected to each other and which guides the air current conveying from/to the discharge port in a predetermined direction,
wherein the first tubular member includes, at one end thereof, an outer circumferential surface which is formed so as to gradually decrease in diameter,
wherein the second tubular member includes, at one end thereof, an inner circumferential surface which is formed so as to gradually increase in diameter,
wherein the first and second tubular members are connected to each other through the outer circumferential surface and the inner circumferential surface, and
wherein one of the tubular members which is connected to the housing is configured to be connected to the housing at a plurality of rotational positions about an axis of the tubular member.

According to the invention, there can be provided the blower apparatus which can employ the air conveying tube in which the tubular members can preferably connected together although the tubular members are not fabricated with good dimensional accuracy and which can be shaped to any other shapes than the circular shape at the distal end thereof.

DESCRIPTION OF EXEMPLARY EMBODIMENTS

First Embodiment

Figure 1:
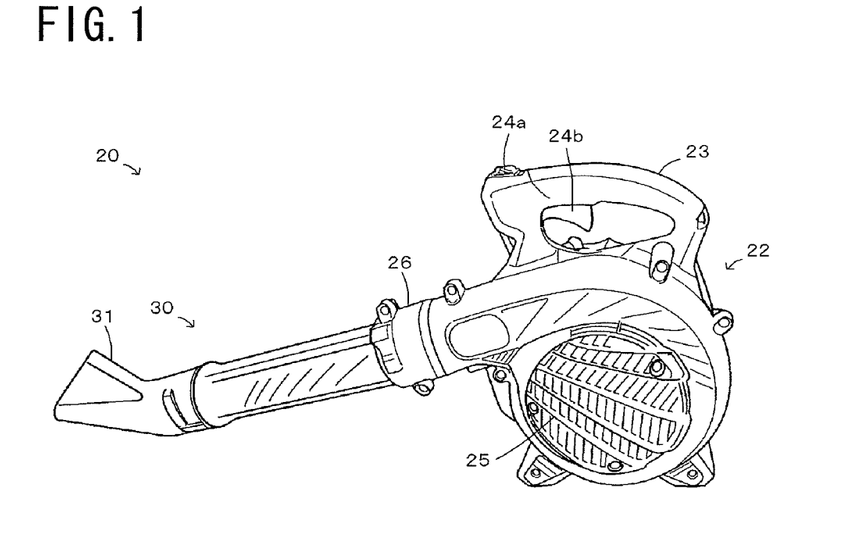
FIG. 1 is an external perspective view showing an example of an external appearance of a blower apparatus as a first embodiment of the invention.

FIG. 1 is an external perspective view showing an example of an external appearance of a blower apparatus 20 as a first embodiment of the invention. As is shown in FIG. 1, the blower apparatus 20 according to the embodiment includes a housing 22, an engine (a drive source), not shown, which is accommodated within the housing 22, a fan, not shown, which rotates based on power from the engine and takes in outside air while forcing out the air so taken in, and an air conveying tube 30 for guiding the air forced out by the fan in a predetermined direction.

The housing 22 is formed, for example, by injection molding a reinforced plastic into a mold and accommodates the engine and the fan therein. The housing 22 is formed by a case which is divided into two halves each having a joining surface which extends along an air conveying direction of a discharge port 26. An intake port 25 for taking in outside air and the discharge port 26 for discharging the air so taken in are formed in the housing 22. The intake port 25 is formed in a side surface of the housing 22, and the discharge port 26 is formed into a cylindrical shape which projects in a direction which is substantially normal to the intake port 25. In addition, a dust cover is attached to the intake port 25 for restraining the intrusion of foreign matters such as dust into the housing, and the air conveying tube 30 is attached to the discharge port 26 for guiding the air discharged from the discharge port 26 in a desired direction.

A handle 23 is provided on the housing 22. The handle 23 is formed integrally with the housing 22. A main switch 24 which is connected to an electric circuit for driving the engine and a lever 24b to which a throttle wire for controlling a carburetor of the engine is connected are provided in the handle 23. In this embodiment, the handle 23 and the intake port 25 are disposed on substantially the same plane.

In this embodiment, the drive source employs the engine which operates on a hydrocarbon-based fuel such as gasoline to output power. However, a known internal combustion engine or a known motor such as a synchronous motor or an induction motor may be employed as the drive source. In this embodiment, the engine can be driven by turning on the main switch 24a, and when the handle 23 is gripped so as to cause the lever 24b to approach the handle 23, the rotation speed of the engine is increased to rotate the fan. When a motor is used as the drive source, the motor may be driven by use of an output from an external power supply or may be driven by use of electric power supplied from a power source installed such as a fuel cell or a secondary battery.

The fan is mounted on an output shaft (a crankshaft) of the engine separately from a cooling fan of the engine and is accommodated in an interior of a volute portion formed within the housing 22. When the fan rotates, air (outside air) is taken into the housing 22 from the intake port 25, and the air so taken into the housing 22 then enters between a plurality of blade portions. The air flows in a direction following an external shape of the fan while turning together with the fan and is blown out of the discharge port 26 after having moved along an inner circumference of the volute portion.

The air conveying tube 30 is formed of, for example, a resin material such as polyethylene (PE) and is connected to the discharge port 26 so as to guide the air discharged from the discharge port 26 in the housing 22 in the desired direction. The air conveying tube 30 is formed by connecting together a plurality of tubular members, and a nozzle 31 is attached to a distal end thereof. The plurality of tubular members are formed by blow molding in which a material is forcibly swollen to match a mold cavity from the inside of the material and shaping by internal air pressure and are connected to each other so as to make up the air conveying tube 30.

Figure 2:
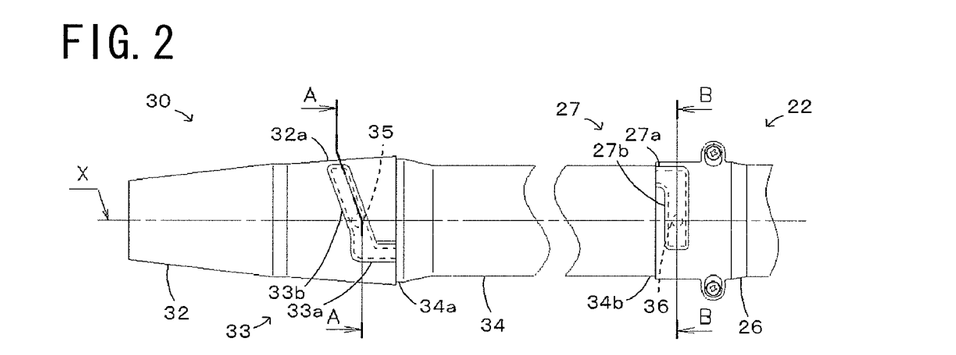
FIG. 2 is an exemplary diagram showing exemplarily a state of a portion lying near a connecting portion between a housing and an air conveying tube of the blower apparatus of the first embodiment.
Figure 3:
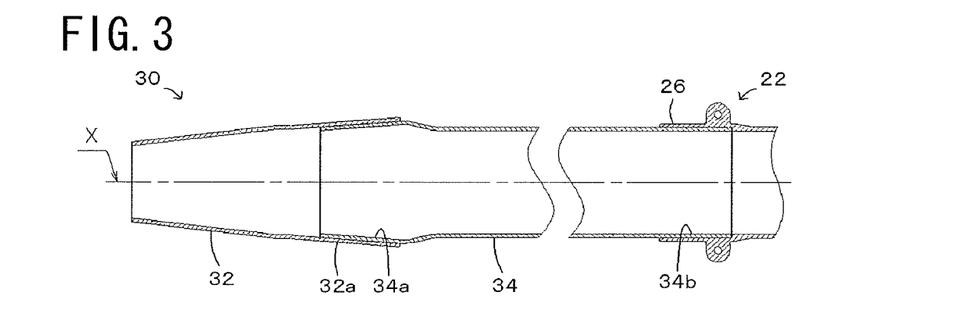
FIG. 3 is a vertical sectional view of the portion lying near the connecting portion between the housing and the air conveying tube as an example of an explanatory diagram.
Figure 4:
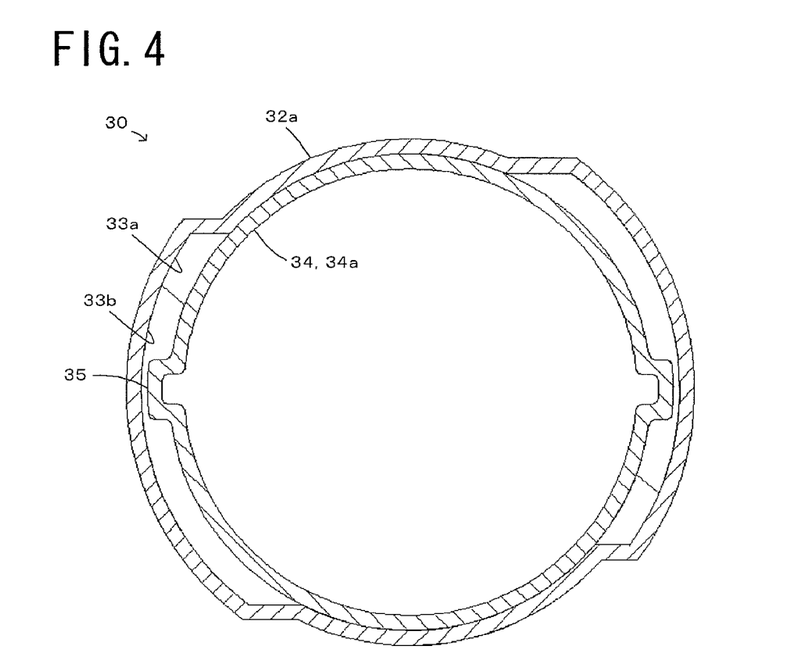
FIG. 4 is a cross-sectional view of the air conveying tube taken along the line A-A and viewed in a direction indicated by arrows A, A in FIG. 2.
Figure 5:
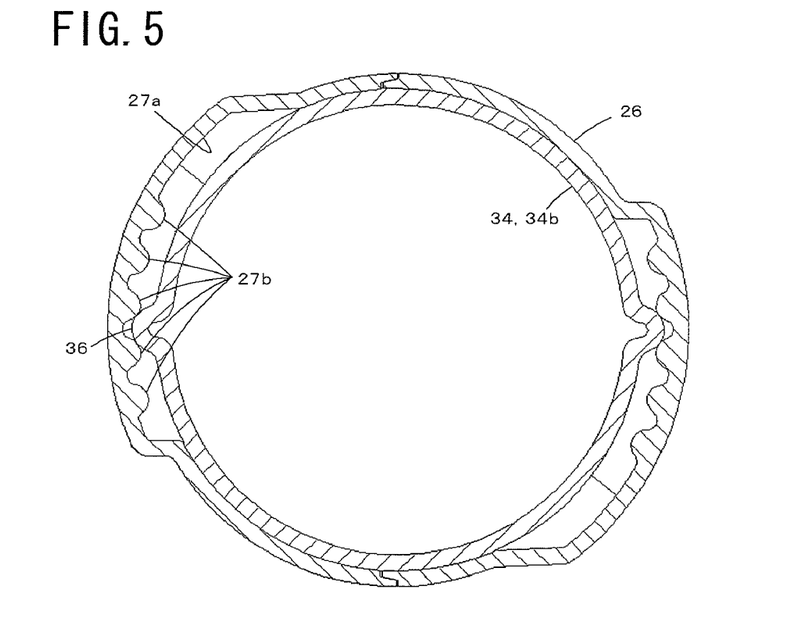
FIG. 5 is a cross-sectional view of the air conveying tube taken along the line B-B and viewed in a direction indicated by arrows B, B in FIG. 2.

FIG. 2 shows exemplarily a state of a portion lying near the connecting portion between the discharge port 26 in the housing 22 and the air conveying tube 30 of the blower apparatus of the first embodiment, FIG. 3 shows a vertical sectional view of the portion lying near the connecting portion between the discharge port 26 in the housing 22 and the air conveying tube 30 as an example of an explanatory diagram, FIG. 4 is a cross-sectional view of the air conveying tube 30 taken along the line A-A and viewed in a direction indicated by arrows A, A in FIG. 2, and FIG. 5 is a cross-sectional view of the air conveying tube 30 taken along the line B-B and viewed in a direction indicated by arrows B, B in FIG. 2. In this embodiment, as shown in FIGS. 2 and 3, of the two tubular members which are connected to each other, an end 32*a* of one tubular member 32 which lies on a connecting side is formed into a tapered shape which increases in diameter as it approaches an distal end, and an end 34*a* of the other tubular member 34 which lies on a connecting side is formed into a tapered shape which decreases in diameter as it approaches an distal end. Then, the end 34*a* of the tubular member 34 which is made to decrease in diameter as it approaches the distal end is inserted into the tubular member 32 from the end 32*a* thereof which is made to increase in diameter as it approaches the distal end and is forcibly turned into the tubular member 32 so as to bring both tapered surfaces of the tubular members 32, 34 into abutment with each other, whereby the tubular members 32, 34 are joined together. As shown in FIGS. 2 and 4, projecting portions 35 are formed on an outer circumferential surface of the end 34*a* of the tubular member 34, while guide grooves 33 for guiding the corresponding projecting portions 35 are formed in an inner circumferential surface at the end 32*a* of the tubular member 32. The guide groove 33 has an insertion portion 33*a* which communicates with the end of the tubular member 32 and which is formed along an axial direction of the tubular member 32 and a spiral portion 33*b* which communicates with the insertion portion 33*a* and which is formed spirally along the tapered surface. Then, the operator inserts the tubular member 34 into an inside the tubular member 32 so that the projecting portions 35 on the tubular member 34 fit in the insertion portions 33*a* in the tubular member 32 and forcibly turns the tubular members 32, 34 so that the projecting portions 35 are guided along the corresponding spiral portions 33*b* to thereby join the tubular members 32, 34 together. In this way, the end 34*a* of the tubular member 34 which is made to decrease in diameter as it approaches the distal end is inserted into the tubular member 32 from the end 32*a* thereof which is made to increase in diameter as it approaches the distal end and is forcibly turned into the tubular member 32 so as to bring both the tapered surfaces of the tubular members 32, 34 into abutment with each other, whereby the tubular members 32, 34 are joined together preferably while restraining the occurrence of a risk of the tubular members 32, 34 being unable to be joined together or the generation of looseness at the connecting portion even in the event that a molding error is caused in the tubular members 32, 34. It is desirable that the tapered surfaces of the tubular members 32, 34 and the spiral portions 33*b* of the guide grooves 33 are formed long enough in consideration of the molding error of the tubular members.

Next, the connection between the air conveying tube 30 and the housing 22 will be described. The air conveying tube 30 is attached to the discharge port 26 in the housing 22. An end 34*b* of the air conveying tube 30 which is connected to the discharge port 26 in the housing 22 and the discharge port 26 are not formed into tapered shapes but are formed into straight tubular shapes which do not change in diameter. In addition, convexly projecting portions 36 are formed on an outer circumferential surface of the end 34*b* of the tubular member 34 which is to be connected to the discharge port 26 in the housing 22, while connecting grooves 27 are formed at the discharge portion 26 in the housing 22 so as to engage with the corresponding projecting portions 36. The connecting groove 27 includes an insertion portion 27*a* which communicates with the end of the discharge port 26 along an axial direction thereof and an angle adjustment portion 27*b* which communicates with the insertion portion 27*a* and which is formed into an arc shape along a side surface of the connecting groove 27 in a circumferential direction. As is shown in FIG. 5, the connecting groove 27 is formed as a whole into a groove shape for guiding the projecting portion 36 on the tubular member 34. At the angle adjustment portion 27*b*, recess portions whose depth is substantially equal to a depth of the insertion portion 27*a* and projecting portions whose height is slightly smaller than the depth of the insertion portion 27*a* are formed alternately at predetermined intervals, whereby the angle adjustment portion 27*b* is formed into an irregular surface having a plurality of recesses and projections. Then, when the housing 22 and the air conveying tube 30 are connected together, the tubular member 34 (the air conveying tube 30) is inserted into the inside of the discharge port 26 so that the projecting portions 36 on the tubular member 34 fit in the insertion portions 27*a* in the discharge port 26, and the tubular member 34 is turned continuously relative to the housing 22 until the projecting portions 36 on the tubular member 34 ride over the projecting portions on the angular adjustment portions 27*b* in the housing 22. By doing this, the projecting portions 36 on the tubular member 34 are brought into engagement with the irregular surfaces of the connecting grooves 27 in the housing 22, whereby the air conveying tube 30 is attached to the housing 22. As is shown in FIG. 5, the recess portions and the projecting portions are formed alternately at the angle adjustment portions 27*b*. Therefore, when the operator turns the tubular member 34 further, the tubular member 34 can be fixed in place relative to the housing 22 at an arbitrary recess and projection portion. According to this configuration, the operator can appropriately select any recess and projection portions in the connection grooves 27 in the housing 22 for engagement with the projecting portions 36 on the tubular member 34 by turning the air conveying tube 30, thereby making it possible to control the rotational angle of the air conveying tube 30 relative to the housing 22.

In the blower apparatus 20 of the first embodiment that has been described heretofore, the plurality of tubular members 32, 34 are connected to each other to make up the air conveying tube 30 by forcibly turning the end 34*a* of the tubular member 34 which is formed so as to gradually decrease in diameter into the end 32*a* of the other tubular member 32 which is formed so as to gradually increase in diameter so as to bring the tapered surfaces into abutment with each other, and the air conveying tube 30 is rotatably connected to the housing 22. Therefore, even in the event that a slight molding error is caused in the tubular member 32, 34, not only can the tubular members 32, 34 preferably be connected together, but also the angle at a distal end of the air conveying tube 30 can be adjusted as required, whereby air conveying tubes 30 can be used which have any other shapes than a circular shape at distal ends thereof. Namely, as is shown in FIG. 1, the non-circular nozzle 31 can be used at the distal end of the air conveying tube 30. In addition, the projecting portions 36 are provided on the outer circumferential surface of the air conveying tube 30 and the connecting grooves 27 each having the plurality of recesses and projections are provided in the inner circumferential surface of the discharge port 26 in the housing 22, so that the projecting portions 36 on the air conveying tube 30 can engage with an arbitrary recess and projection portions in the connecting grooves 27, whereby the air conveying tube 30 is allowed to rotate. Therefore, the operator can easily adjust the rotational angle of the air conveying tube 30 relative to the housing 22 without employing a tool such as a spanner. Further, the individual tubular members 32, 34 are formed by blow molding in which a material is forcibly swollen to match a mold cavity from the inside of the material and shaping by internal air pressure. Therefore, the tubular members 32, 34 can be molded with ease at low cost. In addition, the air conveying tube 30 and the housing 22 are connected together by fitting the outer circumferential surfaces of the tubular members 32, 34 which are molded with relatively good accuracy by blow molding into the inner circumferential surface of the discharge port 26 in the housing 22. Therefore, the housing 22 and the air conveying tube 30 can be connected together more preferably.

In the blower apparatus 20 of the first embodiment, the connecting grooves 27 each having the connecting portion 27a and the angle adjustment portion 27b are formed in the discharge port 26 in the housing 22 and the projecting portions 36 are provided at the end 34b of the tubular member 34 which is connected to the housing 22. However, a configuration may be adopted in which projecting portions are provided on the inner surface of the discharge port 26 in the housing, while connecting grooves are provided on the outer circumferential surface of the end 34b of the tubular member 34 for engagement with the projecting portions in the housing 22, and the connecting grooves each have an insertion portion which communicates with the end of the tubular member 34 and which is formed to extend along the axial direction of the tubular member 34 and an angle adjustment portion where recess portions which communicate with the insertion portion and whose depth is substantially equal to the depth of the insertion portion and projecting portions whose height is smaller than the depth of the insertion portion are formed alternately along the circumferential direction.

In the blower apparatus 20 of the first embodiment, the end 34b of the tubular member 34 is inserted into the inside of the discharge port 26 in the housing. However, a configuration may be adopted in which the discharge port 26 in the housing 22 is inserted into an inside of the end 34b of the tubular member 34 so that the air conveying tube 30 is rotatably connected to the housing 22. As this occurs, the projecting portions may be formed on the outer circumferential surface of the discharge port 26 in the housing 22, while the connecting grooves each having the insertion portion and the angle adjustment portion may be formed on the inner circumferential surface of the end 34b of the tubular member 34. Alternatively, the projecting portions may be formed on the inner circumferential surface of the discharge port 26 in the housing 22, while the connecting grooves each having the insertion portion and the angle adjustment portion may be formed on the outer circumferential surface of the discharge port 26 in the housing 22.

In addition, in this embodiment, the air conveying tube 30 is connected rotatably to the housing 22. However, the invention is not limited thereto, provided that the rotational position can be changed about the axis of the tubular member 34 relative to the housing 22. For example, a plurality of attaching portions which are formed at predetermined angular intervals are provided, whereby the air conveying tube 30 is removed from the housing 22, and a different attaching portion is selected for attachment of the air conveying tube 30, whereby the rotational angle of the air conveying tube 30 can be changed.

Second Embodiment

Figure 6:
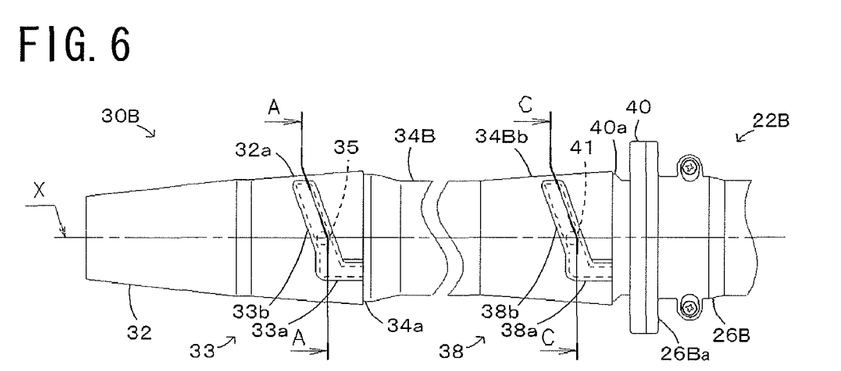
FIG. 6 is an exemplary diagram showing exemplarily a state of a portion lying near a connecting portion between a housing and an air conveying tube of a blower apparatus of a second embodiment.
Figure 7:
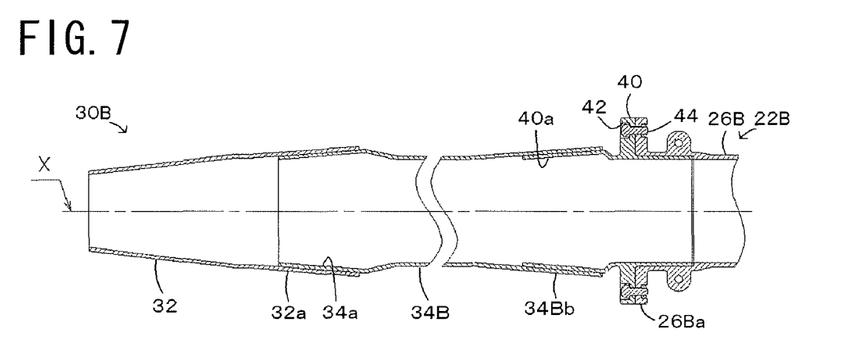
FIG. 7 is a vertical sectional view of a portion lying near the connecting portion between the housing and the air conveying tube as an example of an explanatory diagram.
Figure 8:
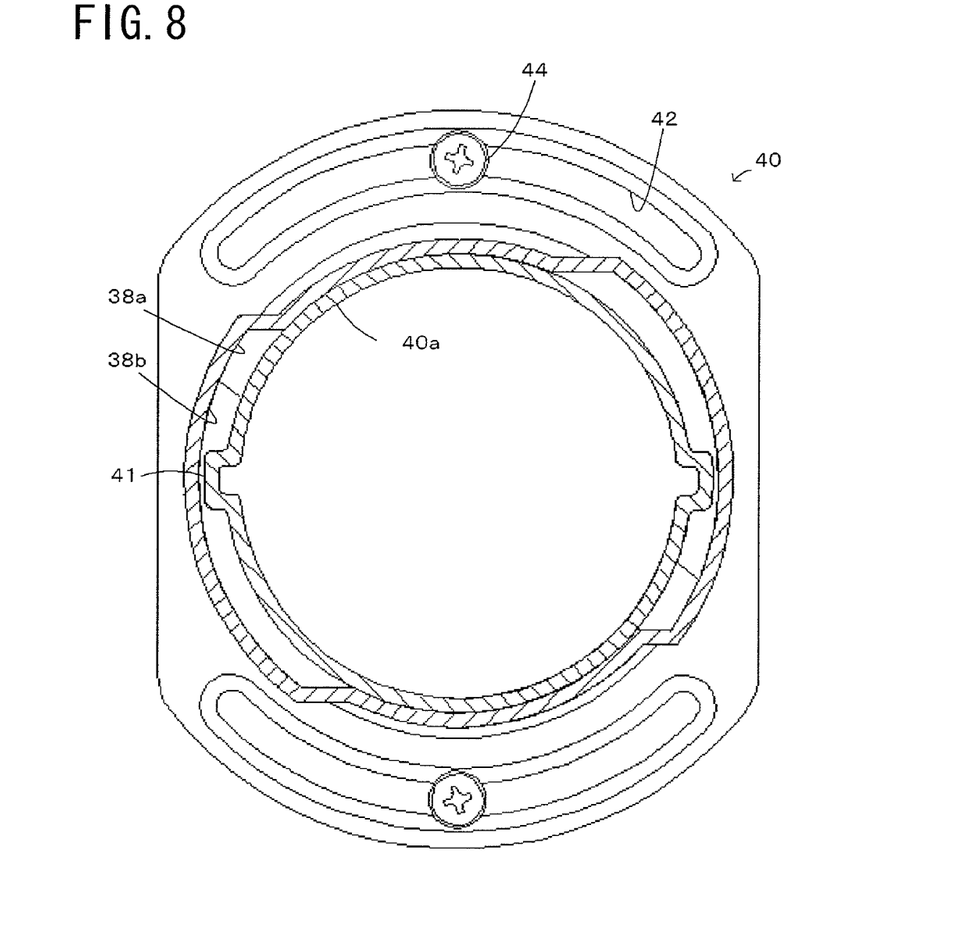
FIG. 8 is a cross-sectional view of the air conveying tube taken along the line C-C and viewed in a direction indicated by arrows C, C in FIG. 6.

Next, a blower apparatus 20B of a second embodiment of the invention will be described. The blower apparatus 20B of the second embodiment employs the same hardware configuration as that of the blower apparatus 20 of the first embodiment which has been described by use of FIG. 1 except for the configuration of a portion lying near a connecting portion between an air conveying tube and a housing. FIG. 6 shows exemplarily a state of a portion lying near a connecting portion between an air conveying tube 30B and a housing 22B of the blower apparatus 20B of the second embodiment, FIG. 7 shows a vertical sectional view of a portion lying near the connecting portion between the air conveying tube 30B and the housing 22B as an example of an explanatory diagram, and FIG. 8 shows a cross-sectional view of the air conveying tube 30B taken along the line C-C and viewed in a direction indicated by arrows C, C in FIG. 6. A cross-sectional view of the air conveying tube 30B taken along the line A-A and viewed in a direction indicated by arrows A, A will be the same as the cross-sectional view of the air conveying tube 30 shown in FIG. 4. In the second embodiment, too, a plurality of tubular members are formed by blow molding. As with the blower apparatus 20 of the first embodiment, a plurality of tubular members which make up the air conveying tube 30B are connected, as is shown in FIGS. 6 and 4, are connected together by forcibly turning an end 34a of one tubular member 34B which gradually decreases in diameter into an end 32a of the other tubular member 32 which gradually increases in diameter so that the tubular members 32, 34B are connected together. In describing a hardware configuration of the blower apparatus 20B of the second embodiment, like reference numerals are given to like configurations to those of the blower apparatus 20 of the first embodiment with a view to avoiding the repetition of the same descriptions. Thus, the description of the like configurations will be omitted here.

In the blower apparatus 20B of the second embodiment, as is shown in FIGS. 6 to 8, the housing 22B and the air conveying tube 30B are connected together via an attachment 40. The attachment 40 can be formed of a reinforced plastic such as nylon or a metal such as aluminum alloy. In the housing 22B of the blower apparatus 20B of the second embodiment, a flange portion 22Ba is formed at an end portion. The attachment 40 has arc-shaped holes 42 in positions which match the flange portion 22Ba of the housing 22 as is shown in FIG. 8. The attachment 40 is screwed to the flange portion 22Ba of the housing 22 by inserting screws 44 (fasteners) through the arc-shaped holes 42 in an axial direction (a left-to-right direction in FIGS. 6 and 7).

In addition, an end 40a of the attachment 40 which is connected to the air conveying tube 30B is formed into a tapered shape which gradually decreases in diameter and projecting portions 41 are formed on the end 40a. An end 34Bb of the air conveying tube 30B which is attached to the attachment 40 is formed into a tapered shape which gradually increases in diameter and guide grooves 38 for guiding the corresponding projecting portions 41 on the attachment 40 are formed in the end 34Bb. The guide grooves 38 are formed similarly to the guide grooves 33 in the tubular member 32 of the first embodiment and each have an insertion portion 38a which communicates with the end of the tubular member 34B and which is formed so as to extend along an axial direction of the tubular member 34B and a spiral portion 38b which communicates with the insertion portion 38a and which is formed spirally along a tapered surface. Then, the operator inserts the end 40a of the attachment 40 into an inside of the tubular member 34B so that the projecting portions 41 on the attachment 40 fit in the corresponding spiral portions 38b and forcibly turns the air conveying tube 30B and the attachment 40 relative to each other so that the projecting portions 41 are guided along the spiral portions 38b, whereby the air conveying tube 30B and the attachment 40 are joined to each other. In this way, the air conveying tube 30B is attached to the housing 22B via the attachment 40. Thus, the operator can adjust arbitrarily the rotational angle of the attachment 40 within a range defined by the arc-shaped grooves 42 in the attachment 40 by loosening the screws 44 with which the attachment 40 and the housing 22 are fastened together. Namely, the operator can adjust continuously and arbitrarily the rotational angle of the air conveying tube 30B connected to the attachment 40 relative to the housing 22B by loosening the screws 44. Thus, as is shown in FIG. 1, a nozzle 31 other than a circular one can be employed at a distal end of the air conveying tube 30.

Thus, also in the blower apparatus 20B of the second embodiment that has been described heretofore, the attachment 40 is provided which is rotatably connected to the housing 22B, and the air conveying tube 30B is attached to the attachment 40. Therefore, the rotational angle of the air conveying tube 30B relative to the housing 22B can be adjusted by adjusting the rotational angle of the attachment 40 relative to the housing 22B, whereby the air conveying tube 30B can be used which has the non-circular nozzle at the distal end thereof. In addition, in the blower apparatus 20B of the second embodiment, the attachment 40 is rotated relative to the housing 22B within the range defined by the arc-shaped grooves 42 by loosening the screws 44. Therefore, the rotational angle of the air conveying tube 30B relative to the housing 22B can be adjusted further minutely.

In the blower apparatus 20B of the second embodiment, the attachment 40 is rotated relative to the housing 22B by loosening the screws 44. However, a configuration may be adopted in which using wing screws are used as the screws 44, so that the operator can rotate the attachment 40 relative to the housing 22B without using any tool.

In the blower apparatus 20B of the second embodiment, the arc-shaped holes 42 are formed in the attachment 40. However, a configuration may be adopted in which arc-shaped holes are formed in the flange portion 22Ba of the housing 22B and holes are formed in the attachment 40 which are large enough for the screws 44 to pass therethrough.

In the blower apparatus 20B of the second embodiment, the attachment 40 and the air conveying tube 30B are connected together by inserting the attachment 40 into the inside of the air conveying tube 30B so that the tapered surfaces of both the members are brought into abutment with each other. However, a configuration may be adopted in which the attachment 40 and the air conveying tube 30B are connected together by inserting the air conveying tube 30B into an inside of the attachment 40 so that tapered surfaces of both the members are brought into abutment with each other. In addition, other methods may be adopted for connection of the attachment 40 with the air conveying tube 30B.

In the blower apparatuses 20, 20B that have been described heretofore, the plurality of tubular members 32, 34, 34B are formed by blow molding. However, the plurality of tubular members may be formed through injection molding or other molding methods.

In the plurality of tubular members 32, 34, 34B of the blower apparatuses 20, 20B that have been described heretofore, the projecting portions 35 are provided on the one tubular member 34 and the guide grooves 33 are provided in the other tubular member 32. However, a configuration may be adopted in which the projecting portions are provided on the inner circumferential surface of the tubular member 32 and the guide grooves are provided in the outer circumferential surface of the tubular member 34 or in which no such guide grooves 33 and projecting portions 35 are provided. In addition, a detent portion whose depth is shallow may be formed at part of the spiral portion 33b in the guide groove 33. In this case, when the operator forcibly turns the tubular members 32, 34 one into the other so that the projecting portions 35 ride over the detent portions to thereby be guided in the spiral portions 33, whereby the tubular members 32, 34 are joined together. By adopting this configuration, even in the event that the connection between the tubular members 32, 34 is loosened during operation, the projecting portions 35 are caught by the detent portions, and therefore, the complete dislodgement of the tubular members 32, 34 from each other can be suppressed.

In the blower apparatus 20, 20B that have been described heretofore, the end 32a of the tubular member is formed into the tapered shape which gradually increases in diameter as it approaches the distal end, and the end 34a of the tubular member 34 is formed into the tapered shape which gradually decreases in diameter as it approaches to the distal end. However, a configuration may be adopted in which the end 32a of the tubular member is formed into a tapered shape which gradually decreases in diameter as it approaches the distal end, and the end 34a of the tubular member 34 is formed into a tapered shape which gradually increases in diameter as it approaches to the distal end, and the tubular members are connected together by forcibly turning the end 32a of the tubular member 32 into the end 34a of the tubular member 34 so that the tapered surfaces are brought into abutment with each other.

In the blower apparatuses 20, 20B that have been described heretofore, the air conveying tube 30 is formed by connecting the two tubular members 32, 34 together. However, three or more tubular members may be connected together to form the air conveying tube 30. In addition, the distal end of the air conveying tube 30 is not limited to the shape of the nozzle shown in FIG. 1 but may be formed into any shape including an oval shape and a quadrangular shape.

Thus, while the embodiments of the invention have been described heretofore, the invention is not limited to those embodiments. Needless to say, the invention can be modified variously without departing from the spirit and scope of the invention. For example, the invention may be applied to an apparatus other than the blower apparatus, for example, a vacuum sweeper.

What is claimed is:
1. A blower apparatus comprising:
a fan;
a drive unit configured to drive the fan;
a housing which accommodates the fan and which has a discharge port for discharging an air current generated by the fan; and
an air conveying tube which includes a plurality of tubular members including first and second tubular members which are connected to each other and which guides the air current discharged from the discharge port in a predetermined direction, wherein one of the tubular members which is connected to the housing is configured to be fixed to the housing at a plurality of rotational positions about an axis of the tubular member, wherein a projecting portion is formed on a circumferential surface of the first tubular member, wherein a guide groove for guiding the projecting portion is formed in a circumferential surface of the second tubular member, the guide groove including a spiral portion, the guide groove defining an opened end configured to receive the projecting portion and a distal closed end opposite the opened end, wherein the projection portion is positioned within the guide groove and spaced apart from the distal closed end when the first and second tubular members are connected together, wherein the first tubular member includes, at one end thereof, an outer circumferential surface which is formed so as to gradually decrease in diameter, wherein the second tubular member includes, at one end thereof, an inner circumferential surface which is formed so as to gradually increase in diameter, and wherein the projection portion is positioned within the guide groove and spaced apart from the distal closed end when the circumferential surface of the first tubular member and the circumferential surface of the second tubular member are contacted together in an axial direction of the tubular member.

2. A blower apparatus according to claim 1, wherein the projecting portion is formed on an outer circumferential surface of the first tubular member.

3. The blower apparatus according to claim 1, wherein one of the discharge portion and the one of the tubular members includes at least one projecting portion which projects radially outwards or radially inwards, the other of the discharge portion and the one of the tubular members includes:
  an insertion groove which communicates to an end of the other of the discharge portion and the one of the tubular members so as to allow the projecting portion to fit therein; and
  irregular grooves which communicate with the insertion groove and which includes recess portions and projecting portions which are formed alternately along a circumferential direction, the recess portions having a depth which is substantially equal to a depth of the insertion groove, the projecting portions having a height which is smaller than the depth of the insertion groove.

4. The blower apparatus according to claim 1, wherein the one of the tubular members is connected to the housing by being inserted into an inside of the discharge port.

5. The blower apparatus according to claim 1 further comprising a connecting member which is connected rotatably to the housing, wherein the one of the tubular members is connected to the housing through the connecting member.

6. The blower apparatus according to claim 5, wherein one of the connecting member and the one of the housing is formed with a guide groove, at least part of the guide groove having an arc shape, and the connecting member is connected to the housing by inserting a fastener in the guide groove.

7. The blower apparatus according to claim 1, wherein at least one of the first and second tubular members is formed by blow molding.

8. The blower apparatus according to claim 1, wherein the one of the tubular members is the first or second tubular member.

9. The blower apparatus according to claim 1, wherein the one of the tubular members is a tubular member other than the first and second tubular members.

10. An air conveying apparatus comprising:
  a housing which has an air conveying port for conveying an air current; and
  an air conveying tube which includes a plurality of tubular members including first and second tubular members which are connected to each other and which guides the air current conveying from/to the discharge port in a predetermined direction,
  wherein the first tubular member includes, at one end thereof, an outer circumferential surface which is formed so as to gradually decrease in diameter,
  wherein the second tubular member includes, at one end thereof, an inner circumferential surface which is formed so as to gradually increase in diameter,
  wherein the first and second tubular members are connected to each other through the outer circumferential surface and the inner circumferential surface,
  wherein one of the tubular members which is connected to the housing is configured to be connected to the housing at a plurality of rotational positions about an axis of the tubular member,
  wherein a projecting portion is formed on the outer circumferential surface of the first tubular member,
  wherein a guide groove for guiding the projecting portion is formed in an inner circumferential surface of the second tubular member, the guide groove including a spiral portion, the guide groove defining an opened end configured to receive the projecting portion and a distal closed end opposite the opened end, and
  wherein the projection portion is positioned within the guide groove and spaced apart from the distal closed end when the circumferential surface of the first tubular member and the circumferential surface of the second tubular member are contacted together in an axial direction of the tubular member.

* * * * *